(12) United States Patent
Mizuhara

(10) Patent No.: US 6,535,316 B1
(45) Date of Patent: Mar. 18, 2003

(54) GENERATION OF HIGH-SPEED DIGITAL OPTICAL SIGNALS

(75) Inventor: Osamu Mizuhara, Allentown, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/374,259

(22) Filed: Aug. 13, 1999

(51) Int. Cl.[7] ............................................. H04B 10/04
(52) U.S. Cl. ..................................... 359/181; 359/245
(58) Field of Search ................................ 359/181, 180, 359/123, 237, 238, 240, 245

(56) References Cited

U.S. PATENT DOCUMENTS 5,625,722 A * 4/1997 Froberg et al. ......... 359/181 X
6,384,954 B1 * 5/2002 Webb ......................... 359/245

OTHER PUBLICATIONS

Park et al, "Chirp Consequences of All–Optical RZ to NRZ Conversion using Cross–Phase Modulation in an Active Semiconductor Photonic Integrated Circuit", IEEE Photonics Technology Letters, vol. 12, No. 3, pp. 233–235, Mar. 2000.*

* cited by examiner

*Primary Examiner*—Thomas Mullen
(74) *Attorney, Agent, or Firm*—Mendelsohn & Associates

(57) ABSTRACT

Two low-speed electrical signals are first input to two electrical Return-to-Zero (RZ) converters to generate low-speed RZ electrical signals. After inverting one of the low-speed RZ electrical signals, the two low-speed RZ signals are then input to a dual-electrode optical modulator, e.g., a Mach-Zehnder interferometer. The dual-electrode optical modulator has a pair of electrodes driven with the pair of differential signals. This dual-electrode optical modulator has multiplexing as well as optical modulating capabilities. Within the dual-electrode optical modulator, each electrode is coupled to a different low-speed RZ electrical signal. The optical modulator also receives an optical beam from a traditional light source, e.g., a laser diode. As the electrodes of the dual-electrode modulator optically modulate independently, they effectively combine the low-speed RZ electrical signals into one Non-Return-To-Zero (NRZ) optical signal by time-division multiplexing the low-speed RZ electrical signals. The resulting output is a high-speed digital optical signal of the desired data rate, which may be greater than 40 Gb/s.

18 Claims, 2 Drawing Sheets

GENERATION OF HIGH-SPEED DIGITAL OPTICAL SIGNALS

BACKGROUND OF THE INVENTION

1. Field of the Invention

The present invention relates to optical communications and, in particular, to the generation of high-speed digital optical signals.

2. Description of the Related Art

The principles of modulating an optical beam to create a high-speed (i.e., high data rate) digital optical signal are well known in the art. One traditional method, as shown in FIG. 1, involves electronically multiplexing a pair of low-speed electrical signals 101 having the same data rate via a time-division multiplexer 103 to create a high-speed time-division multiplexed electrical signal 105 of desired data rate. The low-speed electrical signals 101, even though labeled as low-speed electrical signals, in a typical case, range from 10 Gb/s to 20 Gb/s. The high-speed time-division multiplexed electrical signal 105 is then input to an optical modulator 107 which uses the high-speed time-division multiplexed electrical signal 105 to modulate a continous-wave (cw) optical beam 109 generated by a laser diode. The output from the optical modulator 107 is a high-speed digital optical signal 111 with the data rate of the time-division multiplexed electrical signal 105, but having digital optical characteristics.

The prior art scheme shown in FIG. 1 results in the desired high-speed digital optical signal but this scheme is limited in scope. As the desired data rate of the time-division multiplexed signal increases, it becomes increasingly difficult to multiplex low-speed electrical signals 101 via commercially available time-division multiplexers 103. For example, commercial time-division multiplexers 103 cannot generate signals having a data rate higher than 40 Gb/s.

Another prior art technique, as shown in FIG. 2, is Optical Time-Division Multiplexing (OTDM). This technique involves receiving two low-speed electrical signals 201, inputting each of them to an optical RZ (Return-to-Zero) modulator 202. Each optical RZ modulator 202 uses a low-speed electrical signal 201 to modulate an optical beam 209 and generates a modulated optical signal 203. Then the two modulated optical signals 203 are optically combined (i.e., multiplexed optically) via an optical multiplexer 205 to generate a high-speed digital optical signal 211. The scheme in FIG. 2 varies from the scheme in FIG. 1 by the fact that low-speed electrical signals are first used to generate modulated optical signals that are then optically multiplexed in FIG. 2 rather than first electrically multiplexed and then used to generate a modulated optical signal as in FIG. 1.

The OTDM technique of FIG. 2 is an effective way to create a desired digital optical signal, but is very expensive to integrate in a commercial device. This technique also generates an undesirable coherent beat noise in the resulting high-speed digital optical signal 211.

SUMMARY OF THE INVENTION

A new and improved apparatus and method for generating high-speed digital optical signals are provided. In accordance with the principles of the present invention, two low-speed electrical signals are first input to two electrical Return-to-Zero (RZ) converters to generate RZ electrical signals. After one of the RZ signals is inverted, the RZ electrical signals are then input to a dual-electrode optical modulator, e.g., a Mach-Zehnder interferometer, to generate the desired high-speed digital optical signal.

The dual-electrode optical modulator of the present invention has a pair of electrodes driven with a pair of differential signals. This dual-electrode optical modulator has multiplexing as well as optical modulating capabilities. As such, the optical modulator of the present invention replaces the separate multiplexer and modulator blocks of the prior art. Within the dual-electrode optical modulator, each electrode is coupled to receive a different low-speed RZ electrical signal. The optical modulator also receives an optical beam from a traditional light source, e.g., a laser diode. As the electrodes of the dual-electrode modulator optically modulate independently, they effectively combine the low-speed RZ electrical signals into one Non-Return-To-Zero (NRZ) optical signal by time-division multiplexing the RZ electrical signals as well as modulating the low-speed RZ electrical signals with an optical beam. The resulting output is a high-speed digital optical signal of the desired data rate.

The cost of generating high-speed digital optical signals in accordance with the principles of the present invention is relatively low. Unlike the prior art, the mechanism of the present invention is not limited to any particular data rate. In one embodiment, a method for generating digital optical signal is disclosed. This method comprises the steps of:

(a) converting a first electrical signal into a first Return-to-Zero (RZ) electrical signal;

(b) converting a second electrical signal into a second RZ electrical signal, wherein the second RZ electrical signal is inverted with respect to the first RZ electrical signal; and (c) applying the first and second RZ electrical signals and an optical beam to a dual-electrode optical modulator to generate the digital optical signal.

In an alternative embodiment, an integrated circuit having a digital optical signal generator is disclosed. This digital signal generator comprises:

(a) a first electrical RZ converter configured to generate a first RZ electrical signal from a first electrical input signal;

(b) a second electrical RZ converter coupled to a signal inverter to generate a second RZ electrical signal from a second electrical input signal, wherein the second RZ electrical signal is inverted with respect to the first RZ electrical signal; and (c) a dual-electrode optical modulator configured to receive the first RZ electrical signal and the inverted RZ electrical signal and configured to modulate the first RZ electrical signal and the inverted RZ electrical signal with an optical beam signal to generate a digital optical signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
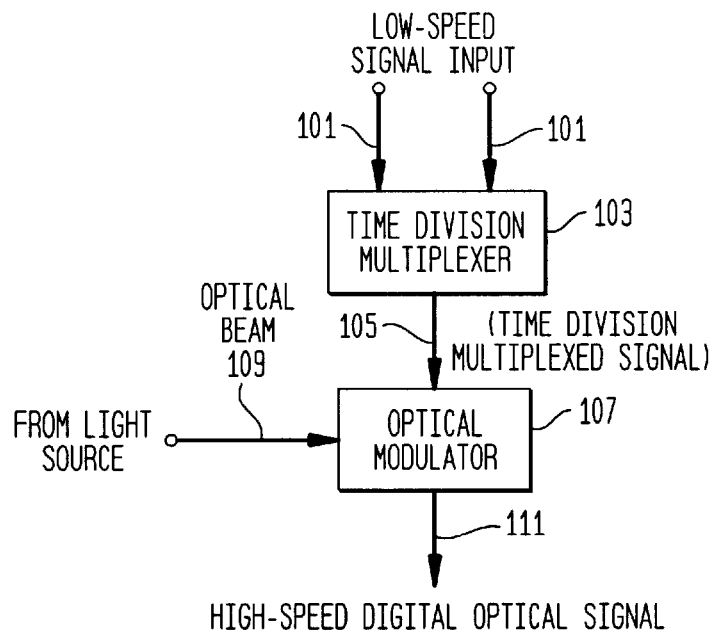
FIG. 1 illustrates a prior art optical modulation scheme used to generate high-speed digital optical signals.
Figure 2:
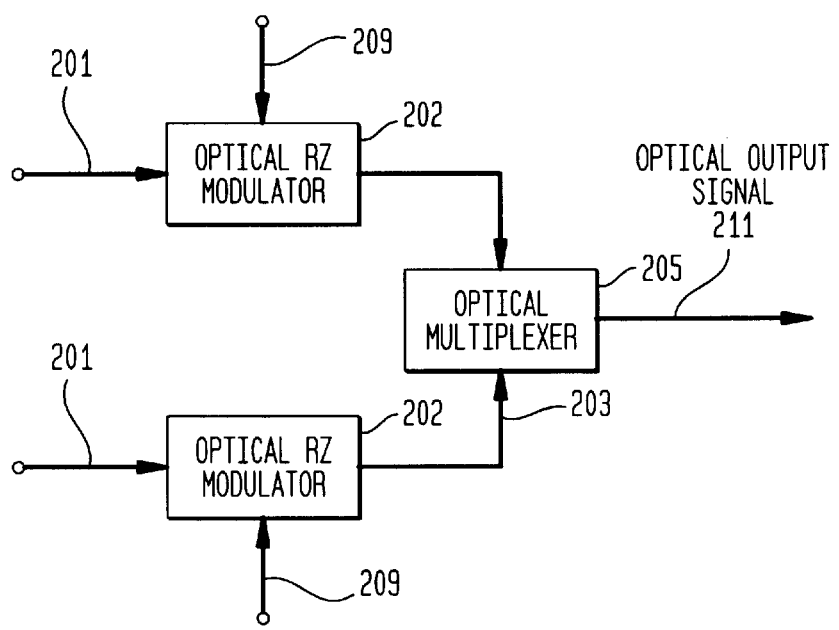
FIG. 2 illustrates another prior art optical modulation scheme used to generate high-speed digital optical signals.
Figure 3:
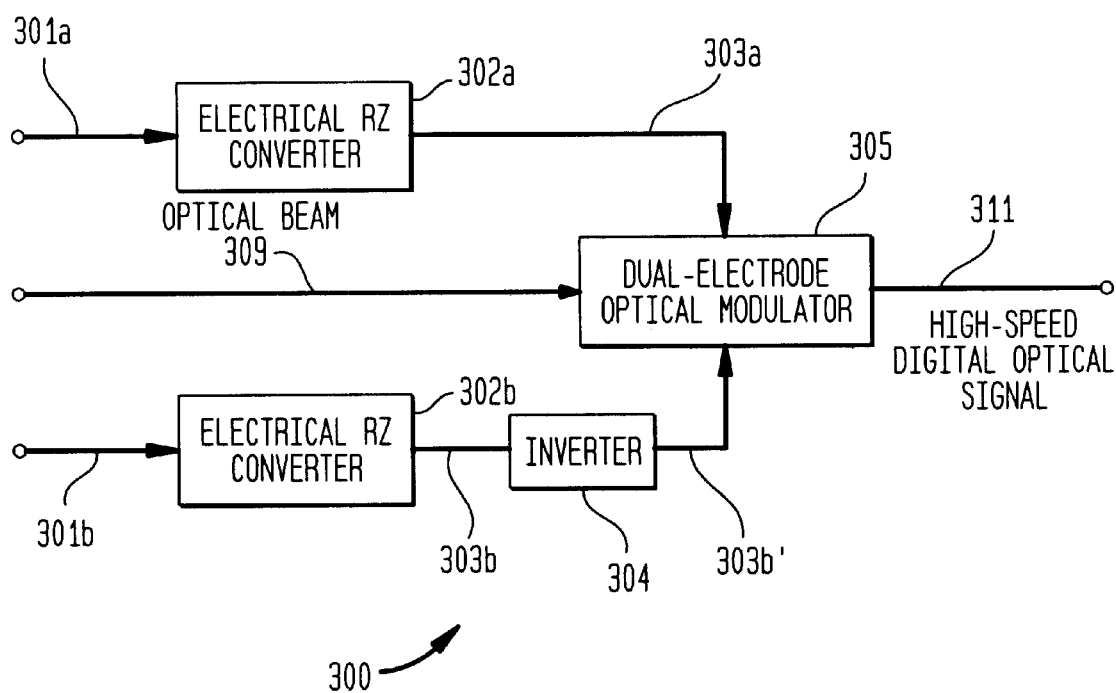
FIG. 3 illustrates an optical modulation scheme used to generate high-speed digital optical signals in accordance with one embodiment of the present invention.

Now referring to FIG. 3, an apparatus 300 in accordance with one embodiment of the present invention is shown. The apparatus 300 comprises a pair of electrical RZ converters 302, a signal inverter 304, and a dual-electrode optical modulator 305.

RZ converters 302 are well-known in the art. The first RZ converter 302a is coupled to receive a first low-speed electrical input signal 301a and to generate an RZ electrical signal 303a. The second RZ converter 302b is coupled to receive a second low-speed electrical input signal 301b and to generate an RZ electrical signal 303b. The low-speed electrical input signals 301a and 301b have the same data rate. Similarly, RZ electrical signals 303a and 303b have the same data rate. RZ electrical signals 303a and 303b possess "Return-to-Zero" properties.

RZ electrical signal 303b is inverted (i.e., flipped) at signal inverter 304. The purpose of signal inverter 304 is to invert one of the RZ electrical signals such that one of the RZ electrical signals has a negative amplitude when compared to the other. In FIG. 3, for illustrative purposes, RZ electrical signal 303b is inverted to create an inverted RZ electrical signal 303b'. In practice, however, either of RZ electrical signals 303a and 303b may be inverted. Moreover, in alternative embodiments, signal inverter 304 may be coupled to the input of the electrical RZ converter to invert the low-speed electrical input signal before the low-speed electrical input signal is converted to an RZ electrical signal. The inversion step is performed because dual-electrode modulator 305 has an inherent property of inverting one of its input signals. Thus, to compensate for this inherent property, the signal inversion is performed before RZ electrical signals are input to dual-electrode modulator 305.

The RZ electrical signals 303a and 303b' are respectively input to each optical electrode of the dual-electrode optical modulator 305. Dual-electrode optical modulator 305 of the present invention is a combination modulator and multiplexer wherein modulating and time-division multiplexing steps are performed concurrently in one component.

In addition to RZ electrical signals 303a and 303b', dual-electrode optical modulator 305 also receives an optical beam 309 from an optical source, e.g., a conventional laser diode. Optical modulator 305 receives RZ electrical signals 303a and 303b'(inverted with respect to each other) and then performs signal inversion on one of the RZ signals to generate a pair of inphase electrical signals. Generally, both in-phase electrical signals have positive amplitudes. One of the in-phase electrical signals is staggered (i.e. temporarily delayed) so that the resulting electrical signals have a phase offset when compared to each other. The electrical signals having a phase offset are time-division multiplexed and used to modulate the optical beam to create the desired high-speed digital optical signal 311. In this embodiment, the signals having a phase offset are RZ electrical signals, but output signal 311 is a high-speed digital optical signal having NRZ (non-return-to-zero) properties.

The apparatus as described in FIG. 3 is a low-cost solution to create desired high-speed digital optical signals. The apparatus of the present invention is easy to implement on an integrated circuit or on a programmable device. Also, the cost of generating high-speed digital signal in accordance with the principles of the present invention is relatively low. Also, the mechanism of apparatus 300 is not limited to any particular data rate. The data rate of the low-speed electrical input signals may be higher than 20 Gb/s and the data rate of the high-speed digital optical signal may be higher than 40 Gb/s.

High-speed digital optical signal 311 generated in accordance with the principles of the present invention may have a high intensity. The dispersive effects and polarization effects are reduced by the push-pull actions of the electrodes of the dual-electrode optical modulator 305.

The principles of the invention permit the use of a commercially available dual-electrode optical modulator. One such well-known optical modulator is the Lithium Niobate Intensity (Amplitude) Modulator. Other commercially available optical modulators may also be chosen. The general principles of the present invention state that the optical modulator 305 may be based on a Mach-Zehnder (M-Z) interferometer design having two electrodes. An M-Z interferometer relies on the interference effects of light. In a standard M-Z interferometer, an optical beam is split by a structure such as a Y-junction into two essentially parallel wavelength arms. These arms are subsequently recombined by another Y-junction or similar structure, such that the output optical intensity is determined by the relative phases of the optical intensities in the two m arms. Optical modulator 305 may have dual complementary outputs, in which case the recombining Y-junction may be replaced by an X-junction (i.e., a cross-over structure) or a directional coupler.

Generally, high-speed digital optical signal 311 is encoded with electronic information (data) by shifting the relative phases of two optical beams propagating along the two arms of optical modulator 305. This is achieved by providing electrode structures along the two arms. In a preferred embodiment, two separate electrode structures are arranged on the two parallel arms. The electrode structures may be slightly different from each other, and in order to achieve a defined chirp performance, may have a different geometry with respect to each waveguide arm in terms of electrode gap, position of each electrode with respect to the waveguide arms, and so on.

In an exemplary optical modulator 305 of FIG. 3, an M-Z interferometer comprising a substrate of Lithium Niobate formed on an optical waveguide may be used.

Within dual-electrode optical modulator 305, optical beam 309 is preferably held in a steady-state, constant-wave (CW) mode. Optical beam 309 operating in CW state has a very narrow line width which minimizes dispersive effects. Operating in CW state also frees optical beam 309 from complicated feedback loops that cause dispersive effects. Optical beam 309 and optical modulator 305 are preferably connected with polarization-maintaining fiber (PMF) to reduce the effects of polarization on optical modulator 305.

Apparatus 300 may be utilized in a plurality of applications. Apparatus 300 is a good choice for high-bandwidth digital systems, for example, undersea systems which use fiber amplifiers to boost signal under the water. Terrestrial telecom links, where the distance is 100 km or more, are also suitable scenarios for the use of apparatus 300.

Furthermore, apparatus 300 may be created as a part of an integrated circuit or an integrated circuit board. It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for generating a digital optical signal, comprising the steps of:

(a) converting a first electrical signal into a first Return-to-Zero (RZ) electrical signal;

(b) converting a second electrical signal into a second RZ electrical signal, wherein the second RZ electrical signal is inverted with respect to the first RZ electrical signal; and (c) applying the first and second RZ electrical signals and an optical beam to a dual-electrode optical modulator to generate the digital optical signal.

2. The invention of claim 1, wherein the optical modulator inverts one of the first and second RZ electrical signals, generates a phase offset between the first and second RZ electrical signals, and modulates the first and second RZ electrical signals with the optical beam to generate the digital optical signal having Non-Return-To-Zero (NRZ) properties.

3. The invention of claim 1, wherein the optical modulator is a Mach-Zehnder interferometer.

4. The invention of claim 1, wherein at least one of the first and second electrical signals has a data rate greater than about 20 Gb/s.

5. The invention of claim 1, wherein:

at least one of the first and second electrical signals has a data rate greater than 20 Gb/s; and the optical modulator is a Mach-Zehnder interferometer that inverts one of the first and second RZ electrical signals, generates a phase offset between the first and second RZ electrical signals, and modulates the first and second RZ signals with the optical beam signal to generate the digital optical signal having NRZ properties.

6. An integrated circuit having a digital optical signal generator comprising:

(a) a first electrical RZ converter configured to generate a first RZ electrical signal from a first electrical input signal;

(b) a second electrical RZ converter coupled to a signal inverter to generate a second RZ electrical signal from a second electrical input signal, wherein the second RZ electrical signal is inverted with respect to the first RZ electrical signal; and (c) a dual-electrode optical modulator configured to receive the first RZ electrical signal and the inverted RZ electrical signal and configured to modulate the first RZ electrical signal and the inverted RZ electrical signal with an optical beam signal to generate a digital optical signal.

7. The invention of claim 6, wherein the optical modulator inverts one of the received RZ electrical signals, generates a phase offset between the received RZ electrical signals, and modulates the received RZ electrical signals with the optical beam to generate the digital optical signal having NRZ properties.

8. The invention of claim 6, wherein the optical modulator is a Mach-Zehnder interferometer.

9. The invention of claim 6, wherein at least one of the first and second electrical signals has a data rate greater than about 20 Gb/s.

10. The invention of claim 6, wherein the signal inverter is configured between the second electrical RZ converter and the dual-electrode optical modulator.

11. The invention of claim 6, wherein:

at least one of the first and second electrical signals has a data rate greater than 20 Gb/s; and the optical modulator is a Mach-Zehnder interferometer that inverts one of the first and second RZ electrical signals, generates a phase offset between the first and second RZ electrical signals, and modulates the first and second RZ signals with the optical beam signal to generate the digital optical signal having NRZ properties.

12. A digital optical signal generator comprising:

(a) a first electrical RZ converter configured to generate a first RZ electrical signal from a first electrical input signal;

(b) a second electrical RZ converter coupled to a signal inverter to generate a second RZ electrical signal from a second electrical input signal, wherein the second RZ electrical signal is inverted with respect to the first RZ electrical signal; and (c) a dual-electrode optical modulator configured to receive the first RZ electrical signal and the inverted RZ electrical signal and configured to modulate the first RZ electrical signal and the inverted RZ electrical signal with an optical beam signal to generate a digital optical signal.

13. The invention of claim 12, wherein the optical modulator inverts one of the received RZ electrical signals, generates a phase offset between the received RZ electrical signals, and modulates the received RZ electrical signals with the optical beam to generate the digital optical signal having NRZ properties.

14. The invention of claim 12, wherein the optical modulator is a Mach-Zehnder interferometer.

15. The invention of claim 12, wherein at least one of the first and second electrical signals has a data rate greater than about 20 Gb/s.

16. The invention of claim 12, wherein the signal inverter is configured between the second electrical RZ converter and the dual-electrode optical modulator.

17. The invention of claim 12, wherein:

at least one of the first and second electrical signals has a data rate greater than 20 Gb/s; and the optical modulator is a Mach-Zehnder interferometer that inverts one of the first and second RZ electrical signals, generates a phase offset between the first and second RZ electrical signals, and modulates the first and second RZ signals with the optical beam signal to generate the digital optical signal having NRZ properties.

18. An apparatus for generating digital optical signals, comprising:

(a) means for converting a first electrical signal into a first RZ electrical signal;

(b) means for converting a second electrical signal into a second RZ electrical signal, wherein the second RZ electrical signal is inverted with respect to the first RZ electrical signal;

(c) means for applying the first and second RZ electrical signals and an optical beam signal to a dual-electrode optical modulator to generate the digital optical signal.

* * * * *